United States Patent Office 2,751,668
Patented June 26, 1956

2,751,668

METHOD OF PRODUCING TITANIUM CARBIDE AND ARTICLE THEREOF

Percy P. Turner, Jr., Euclid, Ohio, and Lewis J. Jones, Elizabeth, Pa., assignors to Thompson Products, Inc., Cleveland, Ohio, a corporation of Ohio No Drawing. Application June 3, 1953,
Serial No. 359,430

6 Claims. (Cl. 29—182.8)

This invention relates to super-refractory materials. More particularly, it relates to super-refractory materials and methods for making the same.

In recent years the demand for super-refractory materials for various uses has considerably increased. In industry and research super-refractory materials are advantageously employed in high temperature furnaces, crucibles, and the like. One of the most recent and important application of super-refractory materials, however, has been in the production of gas turbine aircraft parts such as turbine buckets and nozzle vanes. The necessary properties required of materials which are employed in jet engines are indeed severe, due to the fact that they are subjected to conditions of high tensile stress, exposure to extremely elevated temperatures and accelerated oxidizing conditions for prolonged periods of time. In addition to these rigorous conditions, the gas turbines of jet aircraft are also subject to extreme and sudden temperature fluctuations. These sudden changes in temperature are most often encountered in starting, changing in altitude and stopping the aircraft. For example, it has been calculated that when a jet engine is started, the temperature of the turbine blades may increase at a rate as high as 130° F. per second.

Aircraft designers have been seriously limited in their attempts to increase the efficiency of jet aircraft due to the unavailability of refractory materials capable of withstanding the rigorous operating conditions necessary to increase the performance of present day jet aircraft. Very few alloys are completely satisfactory in meeting the rigid requirements necessary for gas turbine components. The majority of alloys used heretofore have been satisfactory only up to about 1500° F., and it has been shown that their strength will, in general, rapidly decrease above this temperature. Since it is the opinion of present day aircraft designers that temperatures well in excess of 1500° F., are necessary to increase jet aircraft performance, it is obvious that new refractory materials must be obtained before such efficiency can be realized.

Hitherto, attempts at producing refractory materials which would withstand such extreme conditions have met with little success. We have found, however, that it is now possible to produce a super-refractory material which is capable of withstanding the extreme conditions prevalent in gas turbines of jet aircraft. Our investigations have shown that metal carbide bodies, especially titanium carbide bodies, when incorporated with a nickel-aluminum binary material as a binder are especially useful in high temperature application such as jet turbine components.

Of possibly greater importance than the thermal gradients set up in the component parts, is the necessity for these parts to withstand impact from foreign material passing through the engine. The rapidly moving and voluminous combustion products in turbo-jet engines, for example, are capable of carrying foreign particles through the engine and subjecting the engine components to impact. The rate at which this impact is applied is quite important, and for a turbine bucket is much more severe than for a stationary member such as a nozzle vane. The reason for this is the fact that the peripheral speed of a bucketed wheel adds to the rate at which stress is applied when impact occurs on a turbine bucket. The tip ends of turbine buckets operate at about 1100 ft./sec. where the wheel speed proper is 7500 to 8000 R. P. M.

Accordingly, this invention has as an object a super-refractory material capable of withstanding the extreme conditions encountered in gas turbines.

Another object of this invention is a super-refractory material comprising a metal bonded carbide for use in high temperature application such as gas turbine components.

Still another object of this present invention is a method of producing metal bonded carbide for use in high temperature applications such as gas turbine components.

A further object of this invention is a super-refractory and impact resistant material comprising a metal bonded carbide for use as gas turbine components.

Titanium carbide, alone, displays many of the features desirable in a refractory material for use in gas turbines. Among these are its high melting point and its low bulk density. A low bulk density is an especially desirable property in turbine applications where high centrifugal forces are present. Notwithstanding, titanium carbide also displays properties which hinder its use in gas turbines, namely, susceptibility to failure from thermal shock and a tendency to oxidize at elevated temperatures. Accordingly, we have found that by incorporating a novel aluminum-nickel binary as a binder in the titanium carbide we are able to substantially increase the oxidation resistance and improve the strength of the carbide body. Thus, by this method we are able to produce a material which is resistant to thermal shock, with a high tensile strength, high thermal conductivity, low thermal expansion, and low modulus of elasticity, all of which render this super-refractory material especially suitable for jet engine use as claimed.

In essence, the present invention comprises the admixing or incorporating of the intermetallic compound $Ni_3Al$ or $NiAl$ plus $Ni$ with a given weight of titanium carbide powder. The combined binder-carbide mixture is then subjected to sintering treatment, yielding a super-refractory material of desirable quality for use in gas turbines.

The novel intermetallic compound $Ni_3Al$ used as a binder for the titanium carbide in the present invention is more than a mere weight-to-weight metallic alloy mixture. The term "intermetallic compound" as used in this specification is meant to include those combinations of metal which have characteristics different from the ordinary alloy composed of the same ingredients, and which contain these ingredients in definite molecular proportion. This novel intermetallic compound $Ni_3Al$ has unique oxidation resistant properties and ductility, as well as hot strength properties not possessed by other alloys of the nickel-aluminum system. Although the exact mechanics are unknown, by the novel incorporation of this $Ni_3Al$ intermetallic compound as a binder with titanium carbide we are able to form a unique combination displaying properties desired in a super-refractory material for use in gas turbines.

This unique bonding of titanium carbide with the novel intermetallic compound binder $Ni_3Al$ may be effected in one of several manners. For example, the binder may be added to the powdered carbide as $NiAl$ powder and $Ni$ powder in stoichiometric proportions to produce $Ni_3Al$, the compound $Ni_3Al$ as the binder being produced within the carbide body by suitable sintering and heat treating techniques. Alternatively the binder may be added as a preformed $Ni_3Al$ powder followed by a sintering technique. The following table illustrates the preferred range of components which may be employed in the above two mentioned methods:

|       | Composition No. 1 | Composition No. 2 |
|-------|-------------------|-------------------|
| TiC   | 45–70% by weight  | 45–70% by weight. |
| Ni    |                   | 18–32% by weight. |
| NiAl  |                   | 12–23% by weight. |
| Ni₃Al | 30–55% by weight  |                   |

In the first of the aforementioned methods for producing the super-refractory materials of the present invention, the novel $Ni_3Al$ is incorporated into the titanium carbide in the following manner:

Since merely mixing metallic aluminum and metallic nickel in the proper atomic proportions and then heating the mixture to elevated temperatures does not necessarily produce the desired intermetallic compound $Ni_3Al$ because an oxide scum forms on the aluminum causing significant amounts of the aluminum to be unavailable for reaction with Ni, in this embodiment of the present invention, NiAl powder and nickel powder are added to the powdered titanium carbide in proper proportion so as to produce $Ni_3Al$ within the carbide body when the mixture is subjected to suitable sintering and heat treating techniques. The amount of metallic nickel should be at least sufficient to yield the compound $Ni_3Al$. The sintering operation should be carried out near but not substantially in excess of the solidus temperature of the compound $Ni_3Al$. After sufficient time has elapsed to permit the formation of $Ni_3Al$ we find that complete bonding has been established between the $Ni_3Al$ and the titanium carbide.

The rate of the solid state diffusion between NiAl and Ni to form $Ni_3Al$ can be accelerated if finely divided particles are employed in the initial reaction mixture with titanium carbide. Accordingly, we prefer to use substantially powdered NiAl and Ni. Since the compound NiAl is quite brittle, it can be easily pulverized to an extremely fine state of sub-division. The proportion of powdered Ni which is added to the NiAl and titanium carbide mixture is substantially equivalent to the stoichiometric amount of nickel required to produce the compound $Ni_3Al$ from the existing NiAl. The resulting $Ni_3Al$ compound formed as a binder during the process will, therefore, have an aluminum concentration of about 13.5 per cent by weight, with the balance being substantially nickel. In order to insure complete reaction, it is desirable to provide a slight excess of nickel over that stoichiometrically required to produce the compound $Ni_3Al$. The resulting binder composition, however, should contain an aluminum concentration of 13.5 per cent by weight, plus or minus 1 per cent, otherwise the compound $Ni_3Al$ does not result.

The sintering and heat treating step is preferably performed in an electric high temperature furnace or the like. In order to hasten the diffusion of the added nickel into the NiAl, thereby producing a more rapid bonding of the titanium carbide body, the mixture can be heated above the melting point of nickel initially and then the temperature may be reduced to the sintering range of 2300° F., to 2550° F. For example, the powder mixture can be initially formed into a compact of the desired turbine bucket or other jet engine part configuration under usual powder metal technique such as from 5 to 60 tons per square inch pressure. The compact is then heated to a temperature of about 2600° to 2650° F., for a period of about 5 to 10 minutes and then the power of the electric furnace turned off until a temperature in the range of 2300° to 2550° F., is achieved, whereupon the furnace is maintained at temperatures in the last named range for the desired period of time. Within this latter range, the preferred sintering temperature is within the range of 2300° to 2400° F.

The period of time required for complete formation of $Ni_3Al$ and complete bonding of the titanium carbide body therewith is ordinarily on the order of from about 1 to 3 hours, although a period of time from 1 to 25 hours may be employed depending upon the temperature used. To avoid oxidation during heat treatment, vacuum should preferably be used or the furnace should have a non-oxidizing atmosphere such as argon, neon, helium, or the like.

If desired, the sintered compact can be coined and again heat treated to relieve stresses.

An alternative method for producing this novel super-refractory material is as follows:

The $Ni_3Al$ intermetallic binder may be prepared separately and prior to incorporating it as a binder with titanium carbide. If such procedure is followed, the compound NiAl and Ni are reacted in the same stoichiometric proportions and under the same sintering conditions as used in the above method with the exception that no titanium carbide is present. The preformed $Ni_3Al$ thus formed is then mixed with the titanium carbide and the entire mixture is subjected to sintering in the same manner as stated above. When this method is used we have found that an excellent super-refractory product is obtained from a mixture comprising by weight 45 to 70 per cent TiC and 30 to 55 per cent preformed or pre-alloyed $Ni_3Al$.

The resulting bonded titanium carbide bodies obtained by the present invention display highly desirable properties for use in gas turbines. They are resistant to impact and thermal shock; have high tensile strength; a high thermal conductivity; and a low thermal expansion and a high resistance to stress and rupture.

Although the exact mechanics of this unique metal bonding of carbides have not been accurately ascertained, it would appear that there is a mechanical interlocking structure formed. That is, it appears that the $Ni_3Al$ forms a distinct interconnecting network or phase around the titanium carbide particles.

Although the two above mentioned methods of preparing this unique bonded carbide body are the preferred embodiments, it is to be understood that any other method of introducing the binder material into the carbide body such as infiltration or pre-alloying the powdered carbide and so on, is conceivable and to be included within the scope of the present invention.

It will be appreciated that various modifications and variations may be effected without departing from the scope of the novel concepts of the present invention.

We claim as our invention:

1. A super-refractory article comprising at least 45 per cent by weight of titanium carbide and the balance consisting essentially of a $Ni_3Al$ binder.

2. A super-refactory article comprising from about 45 to 70 per cent by weight titanium carbide and from about 30 to 55 per cent by weight $Ni_3Al$ binder.

3. A method for producing a super-refractory article, characterized by the steps of admixing from about 45 to 70 per cent by weight of powdered titanium carbide with sufficient stoichiometric proportions of powdered NiAl and Ni to form from about 30 to 55 per cent by weight of powdered $Ni_3Al$ and sintering said mixture.

4. A method for producing a super-refractory article, characterized by the steps of admixing from about 45 to 70 per cent by weight of powdered titanium carbide with from about 30 to 55 per cent by weight of powdered $Ni_3Al$ and sintering said mixture.

5. A method for producing a super-refractory article, characterized by the steps of admixing from about 45 to 70 per cent by weight of powdered titanium carbide with from about 12 to 23 per cent by weight of powdered NiAl and from about 18 to 32 per cent by weight of powdered Ni and sintering said mixture.

6. A method for producing a super-refractory article, which comprises pressure molding and sintering a mixture comprising at least 45 per cent by weight of powdered titanium carbide and the balance consisting essentially of powdered Ni₃Al.

References Cited in the file of this patent

UNITED STATES PATENTS 1,858,244 Laise ------------------ May 17, 1932
1,981,719 Comstock ------------- Nov. 20, 1934
2,612,443 Goetzel -------------- Sept. 30, 1952

OTHER REFERENCES

Metal Powder Report, vol. No. 8, April 1952, pages 125–126.